June 1, 1965     L. K. McCARROLL     3,186,419
AUTOMOBILE SHELTER TENT
Filed July 27, 1962     2 Sheets-Sheet 1
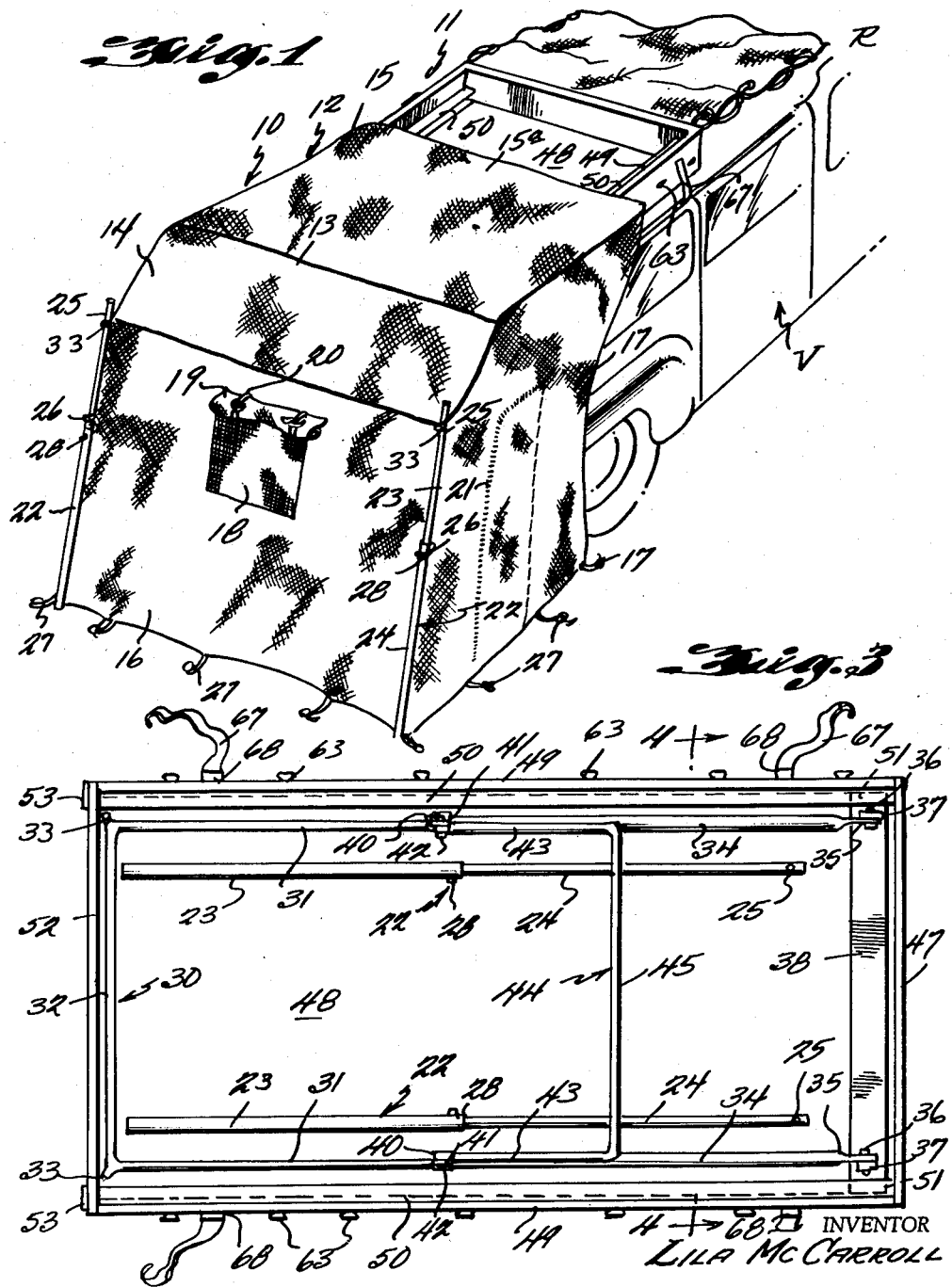
INVENTOR
LILA McCARROLL
BY
Kimmel + Crowell
ATTORNEYS June 1, 1965  L. K. McCARROLL  3,186,419
AUTOMOBILE SHELTER TENT
Filed July 27, 1962  2 Sheets-Sheet 2
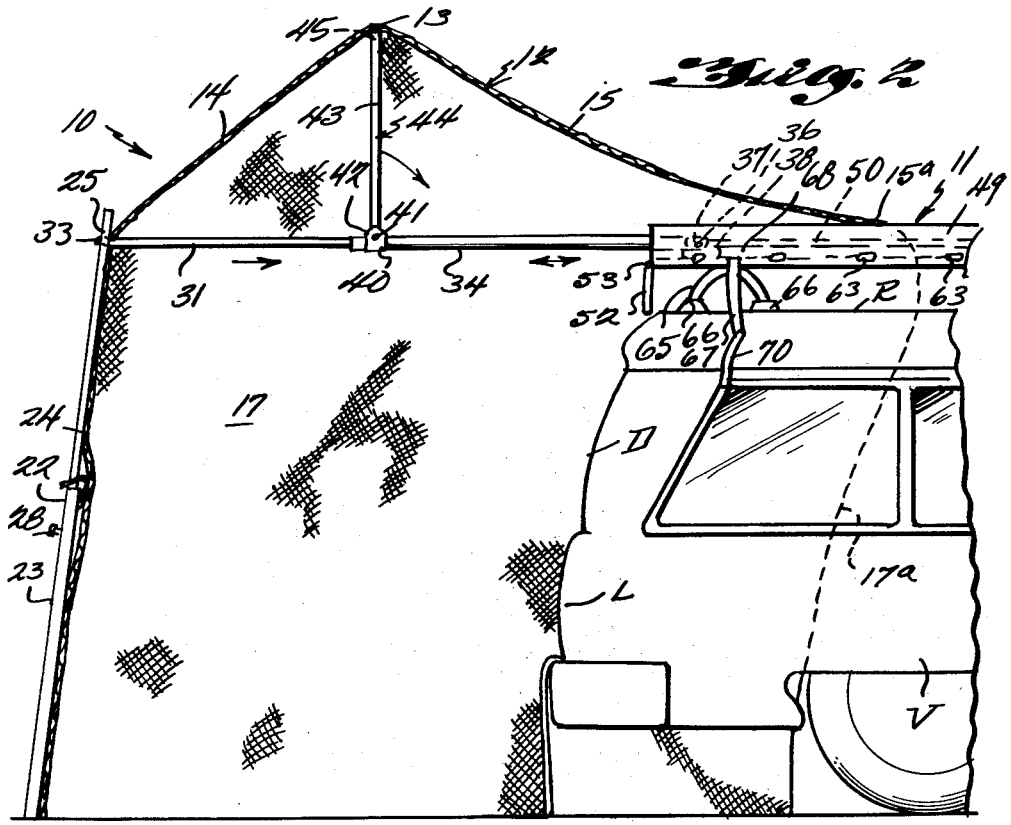
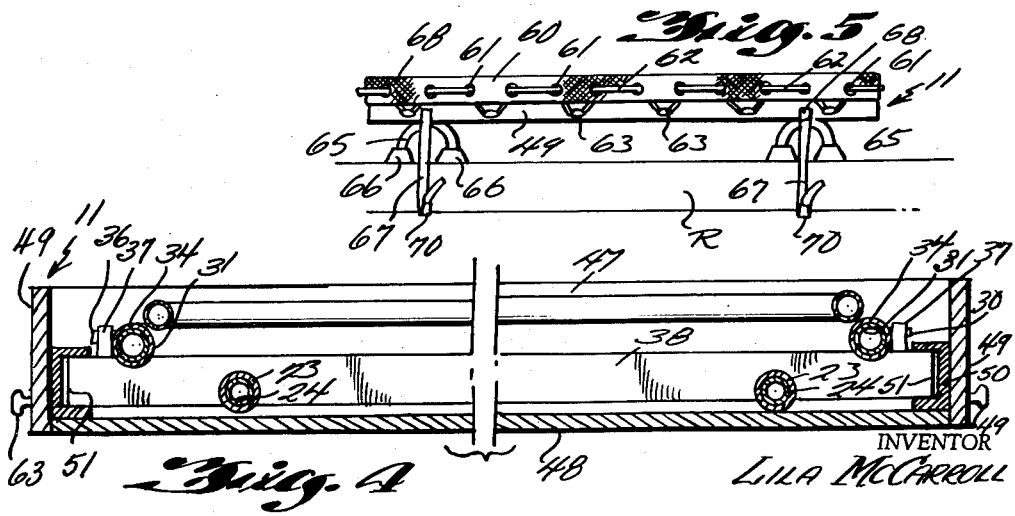
INVENTOR
LILA McCARROLL
BY *Kimmel & Crowell*
ATTORNEYS United States Patent Office 3,186,419
Patented June 1, 1965

3,186,419
AUTOMOBILE SHELTER TENT
Lila K. McCarroll, 1829 Beverly Way,
Sacramento 18, Calif.
Filed July 27, 1962, Ser. No. 212,877
5 Claims. (Cl. 135—1)

This invention relates to an automobile shelter tent, and more particularly to a tent adapted to be positioned partially over the rear of an automotive vehicle, and more particularly to a station wagon, so that ingress may be had to and from the vehicle through the tent, or vice versa.

A primary object of the invention is the provision of an improved tent of this character, which when erected will fit tightly about and over the rear end of the vehicle and which may be folded into a compact space and stored on top of the vehicle for transportation.

An additional object of the invention is the provision of such a tent characterized by a peak, and a support therefor, carried within a receptacle fixed to the top of the vehicle, and having a pole and roof support assembly which may be readily collapsed into the receptacle.

A further object of the invention is the provision of a device of this character which may be readily and expeditiously put up or down, and which, when packed for storage, may occupy a minimum of space.

Still another object of the invention is the provision of a tent of this character which when erected, will be substantially weather proof, and which will, in effect, provide an extension of the sleeping room provided within certain types of station wagons by folding down the seats.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawings:

FIGURE 1 is a perspective view of the tent of the instant invention in erected position, shown in association with a vehicle, such as a station wagon, having a rear door or panel, through which access may be had to the tent from a vehicle, or from the tent to the vehicle.

FIGURE 2 is a side elevational view of the tent, and the associated vehicle, the latter being shown fragmentarily, and the side wall of the tent being removed to show the features of the supporting structure.

FIGURE 3 is a top plan view of the storage receptacle with the components of the frame of the tent in position therein, the tent structure being omitted for the sake of clarity of illustration.

FIGURE 4 is an enlarged sectional view taken substantially along the line 4—4 of FIGURE 3 as viewed in the direction indicated by the arrows, parts thereof being broken away, and FIGURE 5 is a reduced side elevational view of the receptacle closed, strapped and tied, ready for transport, shown in association with a fragment of the vehicle roof.

Similar reference characters refer to similar parts throughout the several views of the drawing.

Having reference now to the drawing in detail, the tent of the instant invention is generally indicated at 10, and is adapted when packed to be secured in folded or collapsed condition into a receptacle 11 secured to the roof R of a motor vehicle V. The tent includes a top generally indicated at 12, having a peak 13, a rearwardly inclined portion 14, and a forwardly inclined portion 15, the tent also including a rear wall 16 and opposite side walls 17. The rear wall 16 is provided with a screened opening 18, a closure member 19 which may be held in open position by straps 20 and one of the side walls 17 is provided with a zippered door or closure 21.

In its upright position as shown in FIGURES 1 and 2, the rear wall 16 is supported at its juncture with side walls 17 by a pair of substantially identical telescopic poles 22, which include two or more telescopic sections 23 and 24, and which are provided at their upper extremities with openings 25, the purpose of which will be more fully described hereinafter. The poles 22 are secured, preferably exteriorly of the tent, by ties 26, and their lower portions may or may not be embedded in the ground as desired.

The lower portions of rear wall 16 and side walls 17 are provided with peg straps or ties 27, by means of which the bottom of the walls may be pegged or otherwise suitably secured to the ground.

The telescoping sections 23 and 24 of rear poles 22 may be secured in a desired position of adjustment by means of set screws or the like 28, to adjust their height to the exact contour of the ground, or for other desired purposes.

The upper portion of the tent, including the side walls 17, and the roof 12 are supported by means of a U-shaped frame, generally indicated at 30, and comprising a pair of tubular side sections 31, which are connected at their outer extremities by a bight 32, at the ends of which are lugs or pins 33 which extend through suitable openings in the tent wall and through the openings 25 in pole sections 24. Side sections 31 telescope into additional side sections 34, which are flattened at their ends as at 35 (see FIG. 3), and apertured to receive pins 36, which are in turn secured to lugs 37 carried by transverse plate 38, the purpose of which will be more fully described hereinafter.

Sections 31 and 34 are extensible from the receptacle 11 mounted on the roof R of vehicle V, as will be more fully described hereinafter.

Adjacent the ends of each tubular member 34 are collars 40 which carry lugs 41 to which are pivoted by means of pivots 42 the ends of arms 43 of a generally U-shaped peak supporting member generally indicated at 44, and including a bight portion 45 which extends transversely beneath the peak 13 of the tent roof.

Receptacle 11 includes a bottom 48, opposite side walls 49, and a rear wall 47. Channel-shaped members 50 extend longitudinally along the side walls 49 and are adapted for the reception of the ends 51 of plate 38, as best shown in FIGURES 3 and 4, the arrangement being such that plate 38 may slide linearly of the channels 50 from the retracted or packed position of FIG. 3 to the extended position of FIG. 2. When in extended position as shown in FIGURE 2, a movable end closure 52 hinged as at 53, is allowed to drop to open position, and the engagement of flattened ends 35 of pivoted sections 34, with plate 38, and the subsequent engagement of plate 38 with the upper and lower walls of channel member 50, retain extended portions 34 and 31 in substantially horizontal position, the engagement of pins or lugs 33 in openings 25 serving to retain and support the tent in open position. As best shown in FIGURES 1 and 2, the ends 17a of side wall 17, as well as the end 15a of inclined portion 15, of the tent extend over the sides and tops of the vehicle V, when the tent is in upright position, providing a secure and substantially wind and water tight shelter, wherein the end of the vehicle V serves as a closure for the open end of the tent.

When it is desired to collapse the tent, the tent structure 12 is removed from the supporting frame, and the straps 27 unpegged, the ties 26 released, and the poles 22 removed from pins 33. Tent 12 after folding may be laid aside, and poles 22 collapsed and placed on the bottom of receptacle 11 as shown in FIGURE 3. U-shaped frame 44 is folded rearwardly over members 34, and member 39 is moved inwardly with its legs 31 telescoping into the tubular members 34. Simultaneously, plate 38 is moved rearwardly until it is adjacent rear wall 47, at which time end closure 52 is swung about hinges 53 and latched in closed position in any desired conventional manner. As best shown in FIGURE 5, a canvas cover 60 provided with an eyelet 61, through which extends a tie cord 62, is then positioned over the open top of receptacle 11, and the tie cord extended around lugs 63 suitably positioned on the exterior of side walls 49 and tightened down, it being noted that the folded tent is placed on top of the folded frame members after their positioning within receptacle 11, thus affording a tight and waterproof container for the packed tent.

Receptacle 11 is mounted on vehicle roof R on U-shaped legs 65 secured to the bottom 48 thereof, and provided at their ends with suction cups 66. Tie down straps 67 extend through eyes 68 carried by side walls 49, and are buckled through conventional apertured lugs 70 carried along the edge of the roof R.

When the tent is in position, and when employed with a station wagon as the carrying vehicle, the rear door or panel D, as well as the folding lower section L at the rear of the station wagon may be opened outwardly, and covered by the tent structure. In the event that the station wagon is of that type wherein, by folding down the seats, beds are provided, the user of the vehicle may sleep interiorly thereof, and use the tent for dressing or other purposes. When employed with another type of vehicle, such as a conventional sedan, access may be had to the interior of the tent through the zippered door 21, which may also be employed with a station wagon when desirable or necessary.

From the foregoing it will now be seen that there is herein provided an improved tent for use with a motor vehicle, which accomplishes all the objects of this invention, and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative, and not in a limiting sense.

I claim:

1. In combination with a motor vehicle having a roof, a rectangular tent and frame holding receptacle adapted to be securely mounted on the roof and including,
  a horizontal bottom, longitudinal side walls, a fixed transverse end wall and a bottom hinged transverse upstanding end wall,
  a flexible cover adapted to be secured over said receptacle and frame when in stored position,
  a pair of facing channels with vertical webs and horizontal legs extending along said side walls of said receptacle,
  said frame including a horizontal transverse slidable plate whose ends are of a thickness equal to the distance between the inside faces of the channel legs,
  a pair of horizontal longitudinal tubular tent side supporting frame members each pivotally secured at a first end to the top of said plate near each end of the latter,
  a substantially U-shaped tent side supporting member formed by a pair of legs and a bight therebetween, the free ends of the legs spaced from the bight being telescopically engaged in said tubular frame members,
  a pair of horizontal lugs extending beyond the corners formed by the junction of each supporting member and the bight and making an oblique angle with each adjacent leg and bight,
  a substantially U-shaped tent roof peak supporting member having each of its legs pivoted to the second ends of each of said tubular frame members,
  said U-shaped side supporting member being horizontally retractable into said tubular frame members when stored, and horizontally extensible for supporting a tent when said bottom hinged transverse end wall is in a downwardly depending position,
  said tent roof peak supporting member being foldable over said tubular members interiorly of said receptacle for storage, and movable to vertical position for supporting a tent,
  a tent structure foldable into said receptacle for storage and when unfolded supported by said frame members, and draped over a rear portion of said receptacle.
  said tent including a peaked roof supported by said roof peak supporting member, side and rear walls supported by said side supporting members and an open front engageable over the top, sides and rear of the vehicle,
  said tent also including a pair of openings at the top of said rear wall and spaced apart sufficiently and of such size as to be engaged snugly by said lugs, whereby the tent may be guided longitudinally respectively from and towards said receptacle upon erection and collapse of the frame.

2. The structure of claim 1 wherein said frame and tent are additionally vertically supported by a pair of ground engaging poles which are medially secured to the tent at the juncture of said rear and side walls, and are secured at their upper ends to said lugs by reception of said lugs through seating openings in the poles.

3. The structure of claim 2 wherein the tent is provided with ground tie down straps, and pole securing ties, and the flexible receptacle cover is secured to the front transverse wall so that it may overlap the unfolded tent portion which is draped over the rear portion of the receptacle.

4. In combination with a motor vehicle having a roof, an open top rectangular storage receptacle adapted to be securely mounted thereon,
  a telescoping frame slidably pivoted within the receptacle so as to be longitudinally extensible, said frame including
  a first horizontal U-shaped member formed by a pair of longitudinal legs and a transverse bight therebetween, the member having an outwardly directed pin-like lug at the intersection of each leg and said bight,
  a pair of horizontal tubular members each receiving at one end a leg of the first member and being pivoted within the receptacle to a sliding member,
  a second U-shaped member having the free ends of each leg pivoted on each tubular adjacent said one end and movable from a horizontal closed position overlying said tubular member to a vertically upstanding position,
  a tent structure including a roof storable in said receptacle and when removed therefrom draped over a rear portion of said receptacle and partially supported by the extending frame including the upstandingly oriented second U-shaped member,
  a pair of spaced openings in the tent at the rearmost portion of its roof, said openings receiving said pin-like lugs.

5. The structure of claim 4 wherein a pair of collapsible upstanding ground engaging poles receive and support said pin-like lugs at desired heights.

(References on following page)

References Cited by the Examiner

UNITED STATES PATENTS

| | | | |
|---|---|---|---|
| 1,502,898 | 7/24 | Berg | 135—4 |
| 1,752,571 | 4/30 | Olson | 135—4 |
| 1,834,489 | 12/31 | Hauber | 135—1 |
| 2,483,478 | 10/49 | Smelker | 135—1 |
| 2,662,232 | 12/53 | Daley | 135—4 |
| 3,020,919 | 2/62 | Crump | 135—1 |
| 3,040,756 | 6/62 | Zerbe | 135—3 |

FOREIGN PATENTS 513,613  6/55  Canada.

HARRISON R. MOSELEY, *Primary Examiner.*